United States Patent
Park et al.

(10) Patent No.: US 9,871,233 B2
(45) Date of Patent: Jan. 16, 2018

(54) RECHARGEABLE BATTERY

(71) Applicant: SAMSUNG SDI CO., LTD., Yongin-si, Gyeonggi-do (KR)

(72) Inventors: Sang-Kyoon Park, Yongin-si (KR); Yong-Chul Seo, Yongin-si (KR); Seung-Ho Kwak, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 281 days.

(21) Appl. No.: 14/733,437

(22) Filed: Jun. 8, 2015

(65) Prior Publication Data

US 2016/0099444 A1  Apr. 7, 2016

(30) Foreign Application Priority Data

Oct. 7, 2014 (KR) .................. 10-2014-0135109

(51) Int. Cl.
| | |
|---|---|
| *H01M 2/20* | (2006.01) |
| *H01M 2/26* | (2006.01) |
| *H01M 2/04* | (2006.01) |
| *H01M 2/30* | (2006.01) |
| *H01M 2/06* | (2006.01) |
| *H01M 10/04* | (2006.01) |

(52) U.S. Cl.
CPC .......... *H01M 2/06* (2013.01); *H01M 2/0473* (2013.01); *H01M 2/204* (2013.01); *H01M 2/263* (2013.01); *H01M 10/0431* (2013.01); *H01M 2/30* (2013.01)

(58) Field of Classification Search
None
See application file for complete search history.

(56) References Cited

U.S. PATENT DOCUMENTS

| | | | | |
|---|---|---|---|---|
| 2011/0076528 | A1* | 3/2011 | Lim | H01M 2/024 429/56 |
| 2012/0308855 | A1* | 12/2012 | Shimizu | H01M 2/0426 429/53 |
| 2013/0029188 | A1* | 1/2013 | Kim | H01M 2/0217 429/53 |
| 2013/0078505 | A1 | 3/2013 | Kim et al. | |

FOREIGN PATENT DOCUMENTS

| | | |
|---|---|---|
| JP | 2013-025882 A | 2/2013 |
| KR | 10-2008-0037869 A | 5/2008 |
| KR | 10-2012-0024412 A | 3/2012 |
| KR | 10-2013-0012539 A | 2/2013 |

OTHER PUBLICATIONS

U.S. Office Action dated Jan. 20, 2017, issued in cross-reference U.S. Appl. No. 14/733,584 (16 pages).
U.S. Office Action dated May 25, 2017, issued in cross-reference U.S. Appl. No. 14/733,584 (17 pages).
U.S. Advisory Action dated Aug. 11, 2017, issued in cross-reference U.S. Appl. No. 14/733,584 (4 pages).

* cited by examiner

*Primary Examiner* — Jonathan Crepeau
(74) *Attorney, Agent, or Firm* — Lewis Roca Rothgerber Christie LLP (57) ABSTRACT

A rechargeable battery includes an electrode assembly comprising electrodes having coated and uncoated regions and being located at opposite sides of a separator; a case accommodating the electrode assembly; a cap plate sealing the case and having terminal holes through which electrode terminals coupled to the uncoated regions extend; a gasket between each electrode terminal and the cap plate; and a first insulating plate between the cap plate and the electrode assembly and fastened to the gaskets.

13 Claims, 7 Drawing Sheets

RECHARGEABLE BATTERY

CROSS-REFERENCE TO RELATED APPLICATION

This application claims priority to and the benefit of Korean Patent Application No. 10-2014-0135109 filed in the Korean intellectual Property Office on Oct. 7, 2014, the entire contents of which are incorporated herein by reference.

BACKGROUND

1. Field

The present invention relates to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and cam corders, while a high-capacity rechargeable battery can be used as a power source for driving motors of a hybrid vehicle, an electric vehicle, and the like.

For example, a rechargeable battery includes an electrode assembly for performing charging and discharging operations, a case for accommodating the electrode assembly, a cap plate combined to an opening of the case, and electrode terminals through which the electrode assembly is drawn out of the cap plate.

In some cases, to electrically insulate the electrode assembly from the case, the rechargeable battery is provided with an insulating tape at a bottom and side wall of the case and at an external circumference of the electrode assembly.

When such a rechargeable battery is crushed in a z-axis direction, the electrode assembly may be torn by the electrode assembly, thereby causing an internal short-circuit.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention relates to a rechargeable battery for insulating an electrode assembly from a cap plate.

An exemplary embodiment of the present invention relates to a rechargeable battery in which an electrode assembly is prevented from being torn by a cap plate in the case of being crushed in a z-axis direction.

A rechargeable battery according to an exemplary embodiment of the present invention includes: an electrode assembly formed by disposing electrodes having coated and uncoated regions at opposite sides of a separator; a case for accommodating the electrode assembly; a cap plate provided with terminal holes to be combined to an opening of the case and allowing electrode terminals coupled to the uncoated regions to be drawn out through the terminal holes by interposing gaskets therebetween; and a first insulating plate installed between the cap plate and the electrode assembly to be fastened to the gaskets.

The uncoated regions and the electrode terminals may be coupled by lead tabs, the lead tabs may be located at a side of the first insulating plate facing the cap plate, and the uncoated regions may pass through receiving grooves provided at lateral sides of the first insulating plate to be coupled to the lead tabs.

The first insulating plate may include terminal-corresponding portions at its opposite lateral sides that are located closer to the electrode assembly than the cap plate to face the electrode terminals, and a plate-corresponding portion located between the terminal-corresponding portions closer to the cap plate than the electrode assembly while having a height difference therebetween.

The plate-corresponding portion may include receiving grooves to correspond to the uncoated regions.

The electrode assembly may be provided as one assembly or two assemblies, and the receiving grooves may be formed at one side or opposite sides of the electrode assembly to correspond to the wide side walls of the case.

The electrode assembly may be formed as two electrode assemblies, and the uncoated regions having the same polarity may face each other to be welded to one of the lead tabs.

The terminal-corresponding portions may further include first support protrusions that protrude toward the cap plate at opposite ends of the first insulating plate in a length direction thereof to support opposite ends of narrow sides of the cap plate.

The plate-corresponding portion may further include second support protrusions that protrude toward the cap plate at opposite ends of the first insulating plate in a width direction thereof to support opposite ends of wide sides of the cap plate.

Lead tabs for connecting the uncoated region and the electrode terminals may be coupled to the uncoated regions that pass through the receiving grooves to be bent above the plate-corresponding portion, and are extended to the terminal-corresponding portions to be coupled to the electrode terminals.

The rechargeable battery according to the exemplary embodiment of the present invention may further include a second insulating plate that is provided with internal terminal holes corresponding to the terminal holes, located at an inner side of the cap plate, and penetrated by the gaskets and the electrode terminals to support the gaskets so as to insulate lead tabs for connecting the uncoated regions and the electrode terminals from the cap plate.

The first and second insulating plates may respectively include first and second internal vent holes that correspond to a vent hole provided in the cap plate.

The first and second insulating plates may respectively include first and second internal electrolyte injection openings corresponding to the electrolyte injection opening that is provided in the cap plate.

The first insulating plate may include hooks that protrude toward the cap plate from the terminal-corresponding portions and subsequently protrude toward the electrode terminals to be fastened to the gaskets.

The gaskets may include support flanges that are interposed between the terminal holes of the cap plate and the electrode terminals to protrude outward of the electrode terminal, and protruding portions that protrude toward the terminal-corresponding portions from the support flanges and are fastened to the hooks through coupling holes.

The electrode terminals may include internal plates that are coupled by welding in the terminal-corresponding portions to the lead tabs for coupling the uncoated regions and the electrode terminals, pillar portions that protrude out of the cap plate through the gaskets and the terminal holes in the internal plate, and external plates that are coupled to the pillar portions at an outer surface of the cap plate.

According to the exemplary embodiment of the present invention, the gaskets are interposed between the electrode terminals and the terminal holes and the first insulating plate installed between the electrode assembly and the cap plate is fastened to the gasket, thereby protecting the electrode assembly from penetration of the cap plate in the case of being crushed in the z-axis direction as well as insulating the electrode assembly from the cap plate.

Since a structure for absorbing penetration of the cap plate in the z-axis direction is formed by fastening of the first insulating plate and the gaskets, the electrode assembly may be prevented from being torn by the penetration and deformation of the cap plate in the case of being crushed in the z-axis direction.

DETAILED DESCRIPTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 1:
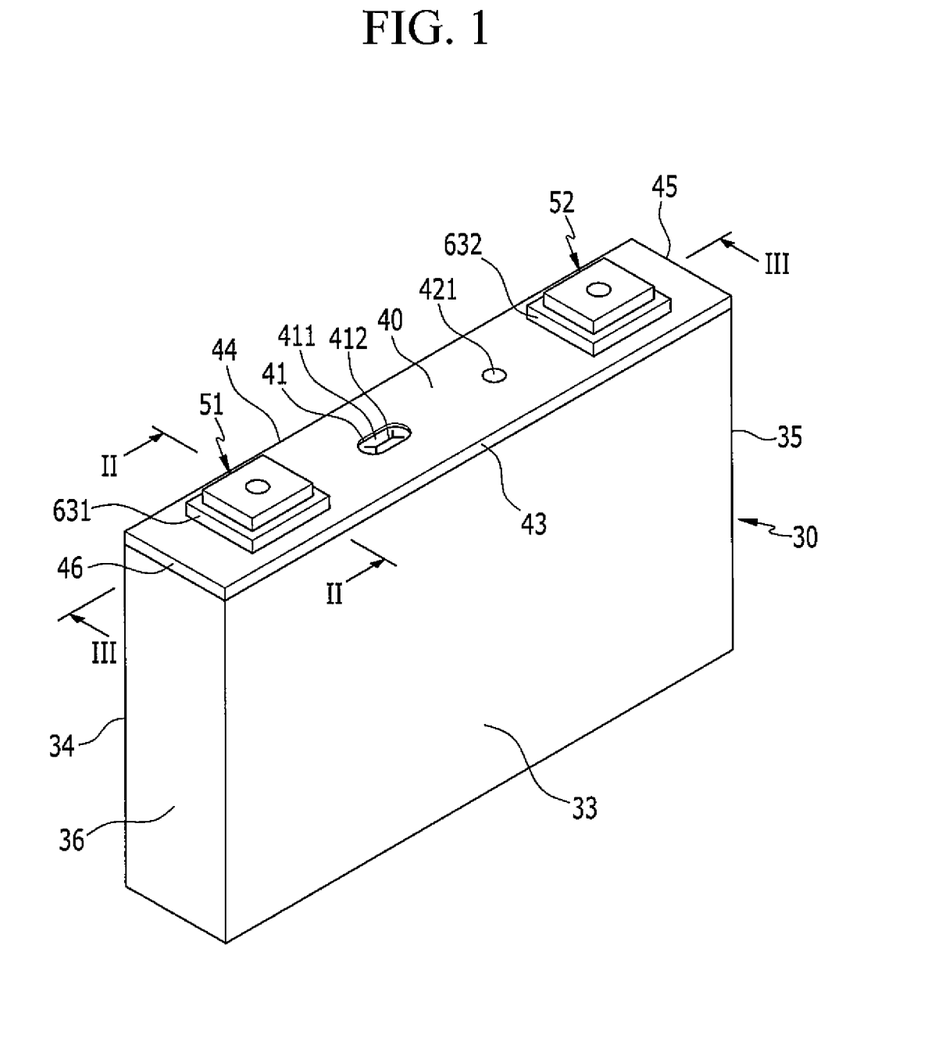
FIG. 1 is a perspective view of a rechargeable battery according to an exemplary embodiment of the present invention.
Figure 2:
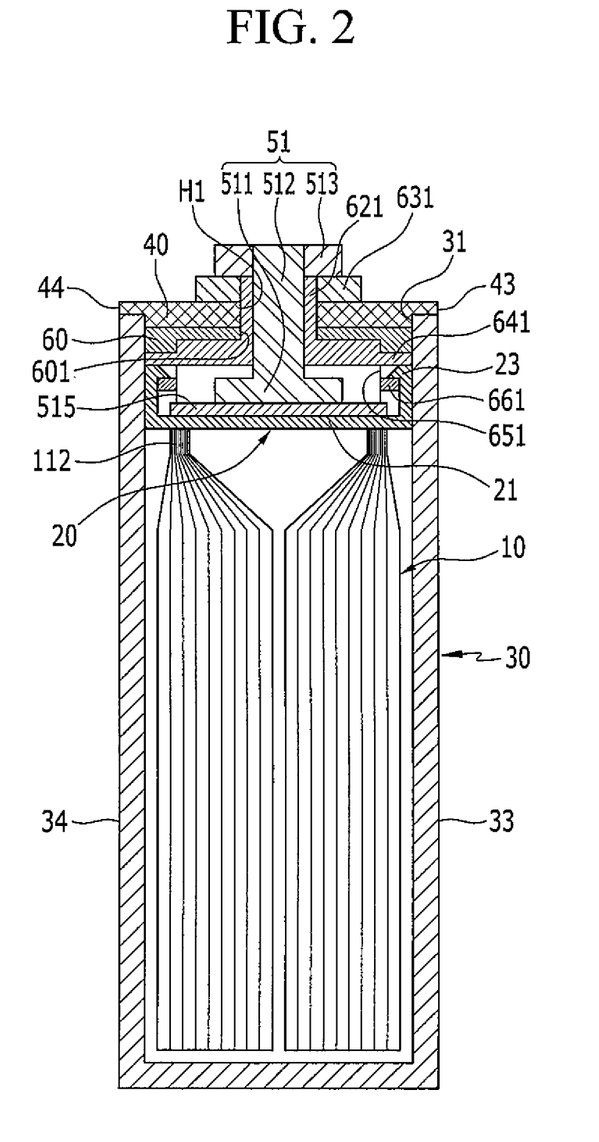
FIG. 2 is a cross-sectional view of FIG. 1 taken along the line II-II.
Figure 3:
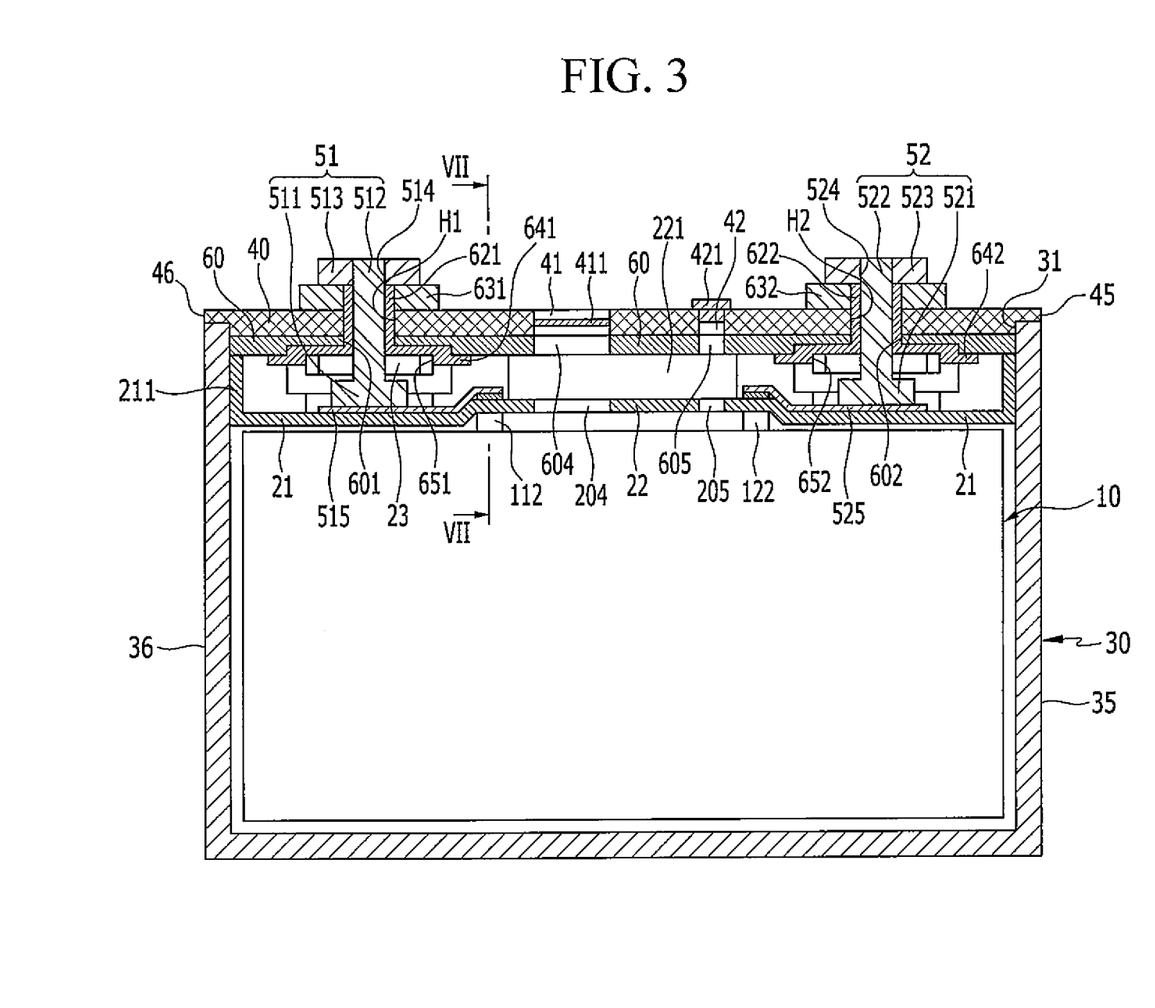
FIG. 3 is a cross-sectional view of FIG. 1 taken along the line III-III.

FIG. 1 is a perspective view of a rechargeable battery according to an exemplary embodiment of the present invention, FIG. 2 is a cross-sectional view of FIG. 1 taken along the line II-II, and FIG. 3 is a cross-sectional view of FIG. 1 taken along the line III-III.

Referring to FIGS. 1 to 3, the rechargeable battery according to the exemplary embodiment includes: an electrode assembly 10 for charging and discharging a current; a case 30 for accommodating the electrode assembly 10; a cap plate 40 coupled to an opening 31 of the case 30 to seal the opening 31; and a first insulating plate 20 installed between the cap plate 40 and the electrode assembly 10.

In addition, the rechargeable battery of the exemplary embodiment may further include a second insulating plate 60 that is located at an inner side of the cap plate 40.

Figure 4:
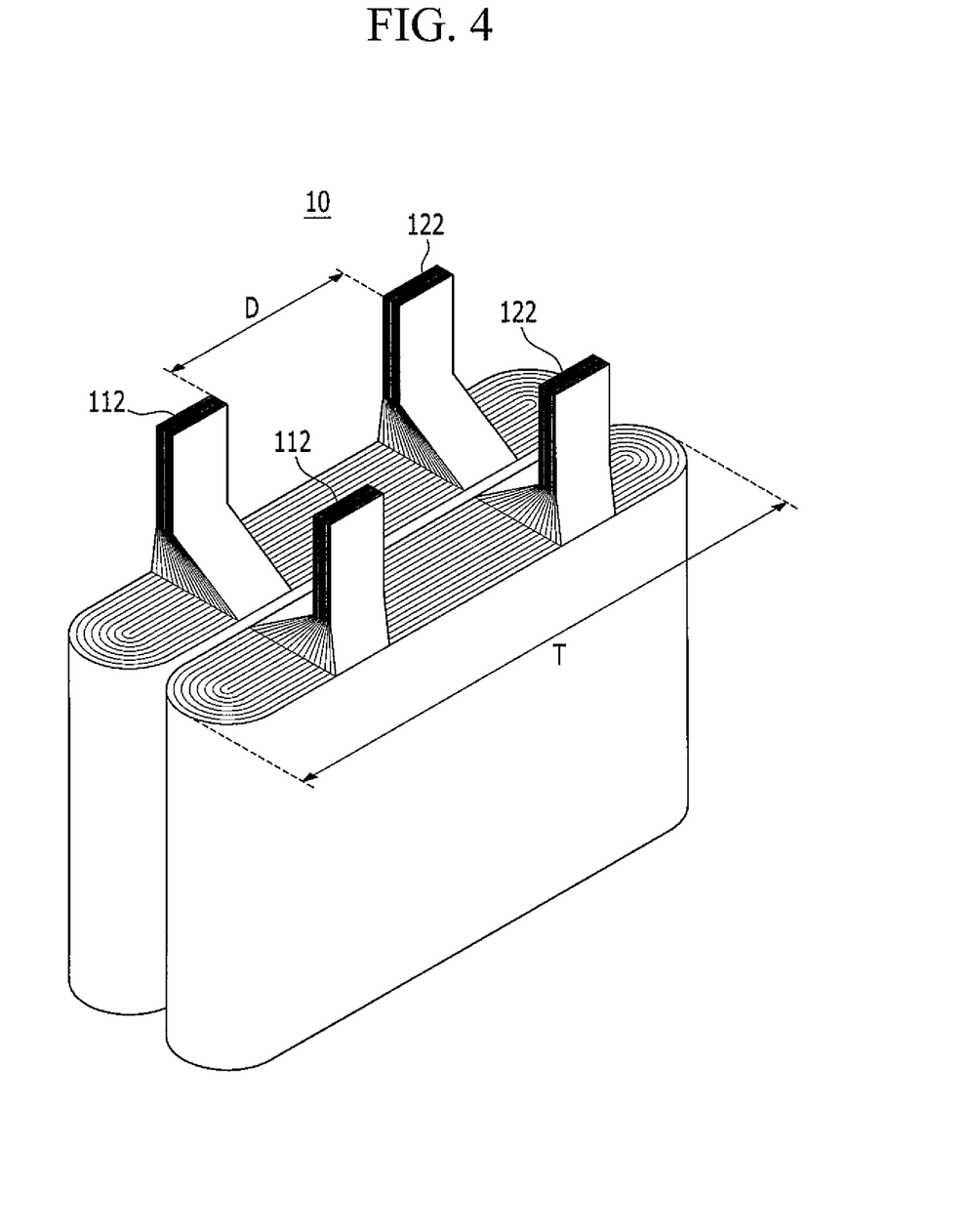
FIG. 4 is perspective view of an electrode assembly of FIG. 2.
Figure 5:
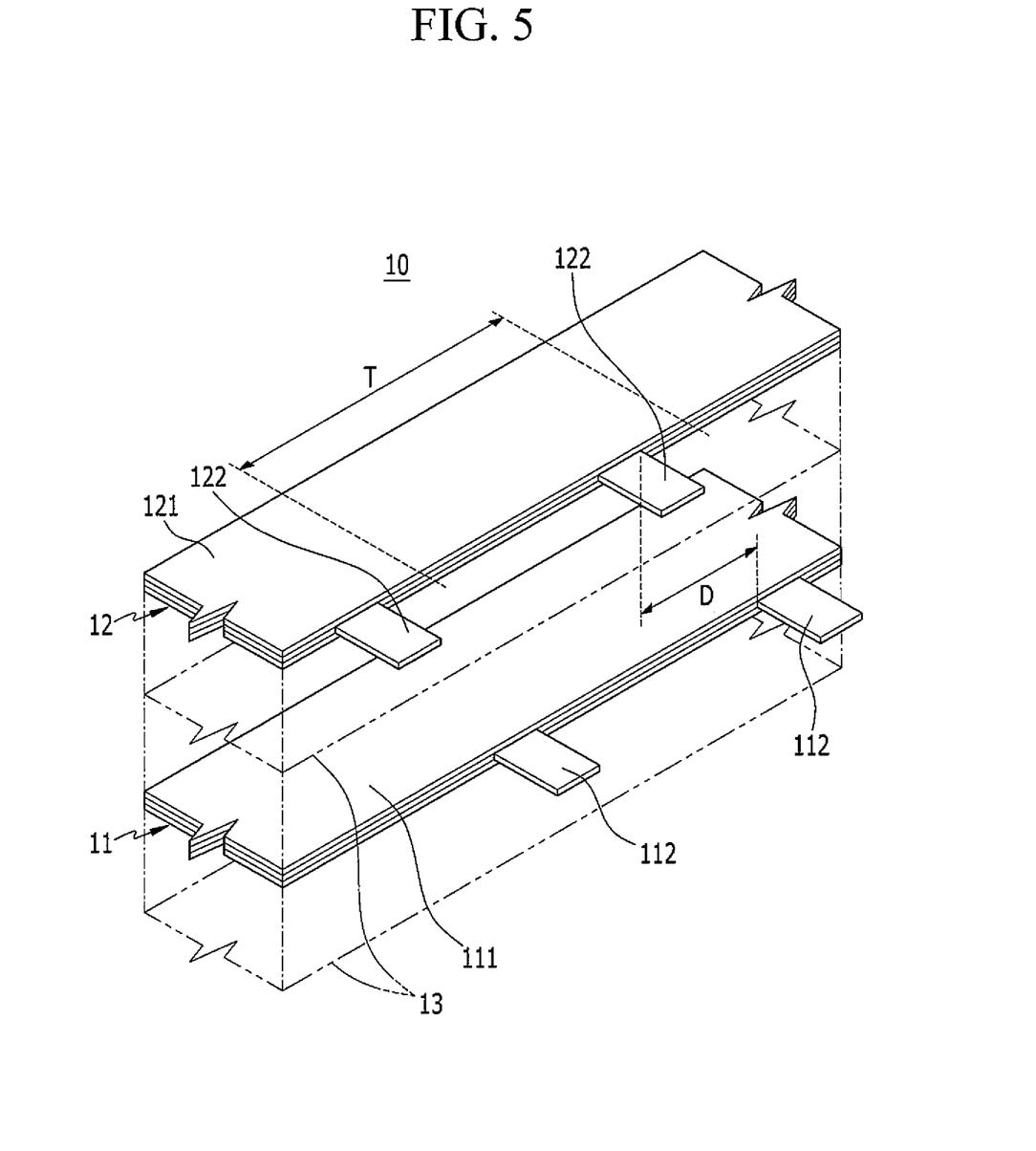
FIG. 5 is an exploded perspective view of the electrode assembly illustrated in FIG. 4.

FIG. 4 is perspective view of the electrode assembly applicable to FIG. 2, and FIG. 5 is an exploded perspective view of the electrode assembly illustrated in FIG. 4.

Referring to FIGS. 4 and 5, the electrode assembly 10 is formed by placing a first electrode 11 (e.g., a negative electrode) and a second electrode 12 (e.g., a positive electrode) at opposite sides of a separator 13 serving as an electrical insulator, and then spirally winding the negative electrode 11, the separator 13, and the positive electrode 12.

The electrode assembly 10 may be formed as one electrode assembly, but is formed as two electrode assemblies in the present exemplary embodiment.

The electrode assembly 10 may be formed in a plate shape, ends of which have an oval shape (upper and lower ends of FIG. 4) to be accommodated in the case 30.

The negative and positive electrodes 11 and 12 respectively include coated regions 111 and 121 where an active material is coated on a current collector formed of a metal foil (e.g., copper or aluminum foil), and uncoated regions 112 and 122 where the active material is not coated thereon to expose the current collector.

In one end of the spirally wound electrode assembly 10, the uncoated regions 112 and 122 are spaced from each other by a distance D within one winding range T of the electrode assembly 10.

In other words, the uncoated region 112 of the negative electrode 11 is located at one side of one end of the spirally wound electrode assembly 10, and the uncoated region 122 of the positive electrode 12 is located at the other side of the one end of the spirally wound electrode assembly 10 to be spaced from the uncoated region 112 of the negative electrode 11 by the distance D.

Accordingly, when the negative and positive electrodes 11 and 12 are spirally wound, the uncoated region 112 of the negative electrode 11 is located to the left of one end of the spirally wound electrode assembly 10 (an upper end of FIG. 4), and the uncoated region 122 of the positive electrode 12 is located to the right of the same end of the electrode assembly 10 (the upper end of FIG. 4).

As such, in the negative and positive electrodes 11 and 12, as areas of the coated regions 111 and 121 are maximized and areas of the uncoated regions 112 and 122 are minimized, capacity of the electrode assembly 10 can be increased.

Figure 6:
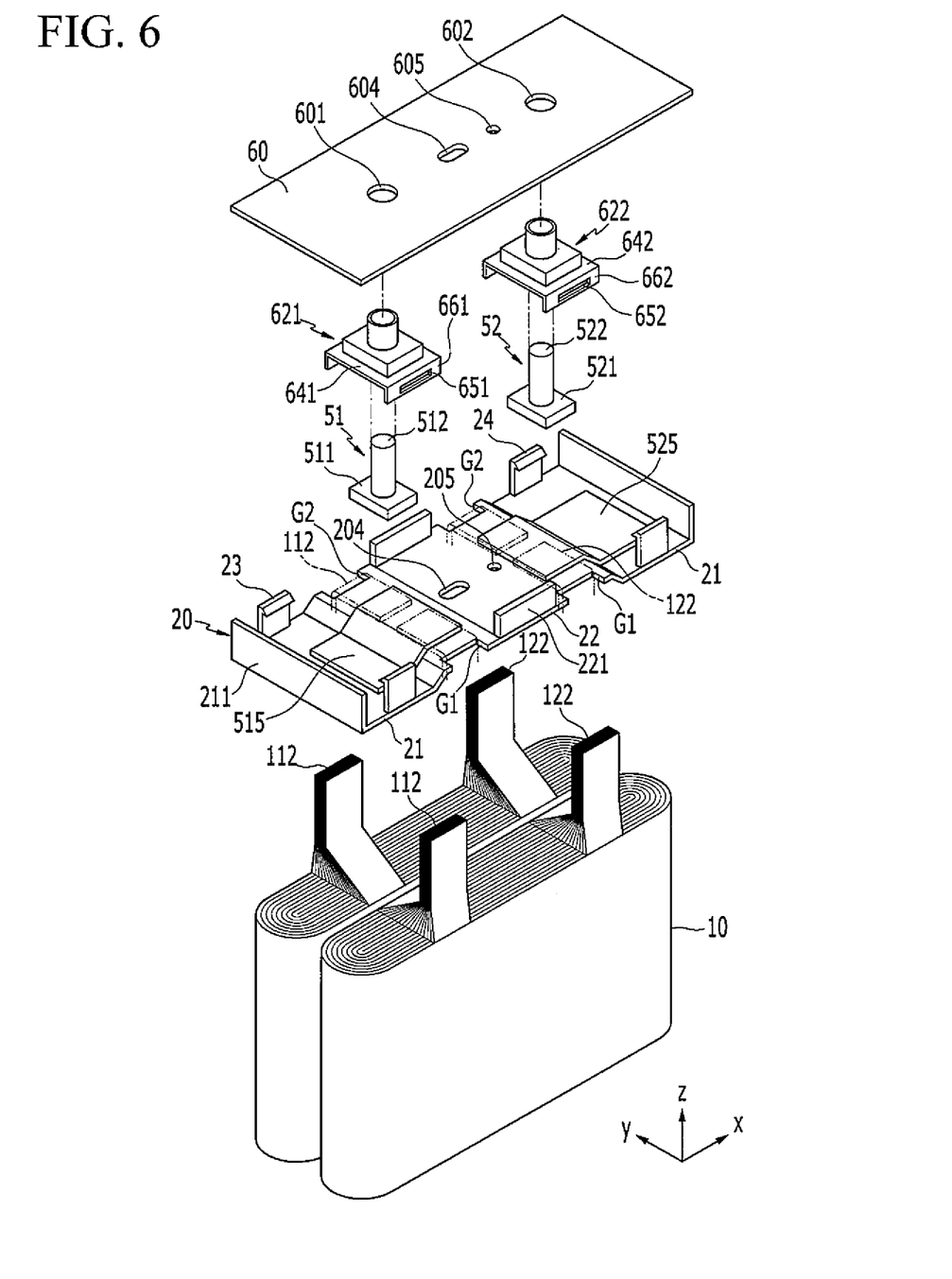
FIG. 6 is an exploded perspective view of negative and positive electrode terminals, gaskets, and first and second insulating plates in the electrode assembly of FIG. 4.

FIG. 6 is an exploded perspective view of negative and positive electrode terminals, gaskets, and first and second insulating plates for the electrode assembly of FIG. 4.

Referring to FIGS. 2 to 4 and 6, two electrode assemblies 10 are located in parallel to be electrically coupled to each other.

As shown in FIGS. 2, 3, and 6, in the two electrode assemblies 10, the uncoated region 112 of the negative electrode 11 of one electrode assembly, along with the uncoated region 112 of the negative electrode 11 of the other electrode assembly, is coupled to a first electrode terminal 51 (e.g., a negative electrode terminal), and the uncoated region 122 of the positive electrode 12 of one electrode assembly, along with the uncoated region 122 of the positive electrode 12 of the other electrode assembly is coupled to a second electrode terminal 52 (e.g., a positive electrode terminal).

Referring back to FIGS. 1 to 3, the case 30 accommodates the electrode assembly 10 and the first and second insulating plates 20 and 60 to form an external surface of the rechargeable battery, and provides mechanical strength for the rechargeable battery.

The case 30 has a space for accommodating one electrode assembly or two or more electrode assemblies 10.

For example, the case 30 has a substantially cuboid shape, and includes a quadrangular opening 31 at one side into which the electrode assembly 10 is inserted, a bottom facing and corresponding to the opening 31, and two wide side walls 33 and 34 and two narrow side walls 35 and 36 that extend between the opening 31 and the bottom.

The cap plate 40 combined to the opening 31 includes wide sides 43 and 44 that correspond to the wide side walls 33 and 34 of the case 30, and narrow sides 45 and 46 that correspond to the narrow side walls 35 and 36 of the case 30.

The narrow sides 45 and 46 are provided to correspond to opposite ends of the first insulating plate 20 in a length direction thereof (x-axis direction).

For example, the case 30 and the cap plate 40 may be formed of aluminum to be welded to each other in the opening 31.

Referring back to FIGS. 2, 3, and 6, the cap plate 40 is combined to the opening 31 of the case 30 to seal the case 30, and is provided with two terminal holes H1 and H2.

The second insulating plate 60 is provided with internal terminal holes 601 and 602 that correspond to the terminal holes H1 and H2, and is located at an inner side of the cap plate 40 to insulate the inner side of the cap plate 40.

In the terminal holes H1 and H2 and the internal terminal holes 601 and 602, the negative and positive electrode terminals 51 and 52 are installed.

In addition, the cap plate 40 is further provided with a vent hole 41 and an electrolyte injection opening 42.

The vent hole 41 is sealed by a vent plate 411 to discharge internal pressure caused by a gas that is generated by the charging and discharging operations of the electrode assembly 10 inside the rechargeable battery.

When the internal pressure of the rechargeable battery reaches a predetermined pressure, the vent plate 411 is ruptured to open the vent hole 41, thereby discharging the gas and the internal pressure.

The vent plate 411 is provided with a notch 412 that induces the rupture.

After the cap plate 40 is combined and welded to the case 30, the electrolyte injection opening 42 allows the electrolyte solution to be injected into the case 30.

After the electrolyte solution is injected, the electrolyte injection opening 42 is sealed by a sealing cap 421.

The first and second insulating plates 20 and 60 are respectively provided with a first internal vent hole 204 and a second internal vent hole 604 that correspond to the vent hole 41.

Since the first and second internal vent holes 204 and 604 are formed to correspond to the vent hole 41 provided in the cap plate 40, they may allow the increased internal pressure caused by the gas generated inside the electrode assembly 10 to be delivered to the vent hole 41 and then to be discharged therethrough.

The first and second insulating plates 20 and 60 are respectively provided with a first internal electrolyte injection opening 205 and a second internal electrolyte injection opening 605 that correspond to the electrolyte injection opening 42.

Since the first and second internal electrolyte injection openings 205 and 605 are formed to correspond to the electrolyte injection opening 42 that is provided in the cap plate 40, the electrolyte solution injected through the electrolyte injection opening 42 may be allowed to be injected into the second and first insulating plates 60 and 20.

In one embodiment, the uncoated regions 112 and 122 of the electrode assembly 10 accommodated inside the case 30 are electrically coupled to the negative and positive electrode terminals 51 and 52 through the first insulating plate 20.

The negative and positive electrode terminals 51 and 52 pass through the internal terminal holes 601 and 602 and the terminal holes H1 and H2 with gaskets 621 and 622 located therebetween, and are then respectively drawn out of the cap plate 40.

The first insulating plate 20 is installed between the cap plate 40 and the electrode assembly 10, and is fastened to the gaskets 621 and 622 while being penetrated by the uncoated regions 112 and 122 coupled to the negative and positive electrode terminals 51 and 52.

In addition, the first insulating plate 20 serves to protect the electrode assembly 10 from the cap plate 40 in the case of being crushed in a z-axis direction.

Figure 7:
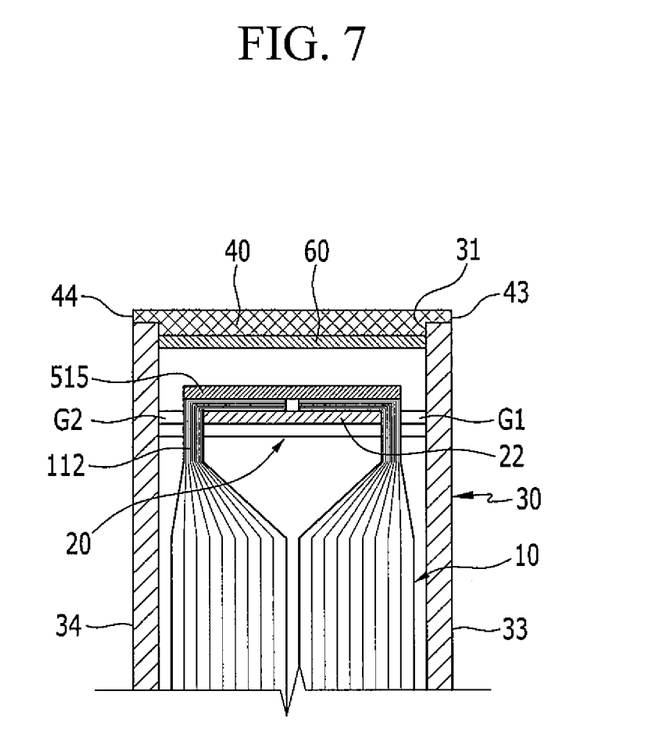
FIG. 7 is a cross-sectional view of FIG. 3 taken along the line VII-VII.

FIG. 7 is a cross-sectional view of FIG. 3 taken along the line VII-VII.

Referring to FIGS. 2, 3, 6, and 7, the uncoated regions 112 and 122 and the negative and positive electrode terminals 51 and 52 are coupled through lead tabs 515 and 525 above the first insulating plate 20.

The lead tabs 515 and 525 are located at a side of the first insulating plate 20 that faces the cap plate 40.

The first insulating plate 20 is provided with receiving grooves G1 and G2 at its lateral sides that allow the uncoated regions 112 and 122 therebelow to penetrate upward.

Accordingly, the uncoated regions 112 and 122 coupled to the electrode assembly 10 pass through the receiving grooves G1 and G2 facing the wide side walls 33 and 34 of the case 30 to be bent above the first insulating plate 20, thereby being coupled to the lead tabs 515 and 525.

As an example, each of the lead tabs 515 and 525 may be welded to the uncoated regions 112 and 122 at one side, while being welded to the negative and positive electrode terminals 51 and 52 at the other side.

To provide a stable connecting structure of the uncoated regions 112 and 122, the first insulating plate 20 includes terminal-corresponding portions 21 and a plate-corresponding portion 22.

The terminal-corresponding portions 21 are located closer to the electrode assembly 10 than the cap plate 40 between the cap plate 40 and the electrode assembly 10, and face the negative and positive electrode terminals 51 and 52 at opposite lateral sides of the first insulating plate 20 in the length direction thereof (x-axis direction).

The plate-corresponding portion 22 is located closer to the cap plate 40 than the electrode assembly 10 between the cap plate 40 and the electrode assembly 10 while having a height difference between the terminal-corresponding portions 21 that are located at its opposite lateral sides.

In other words, since the terminal-corresponding portions 21 and the plate-corresponding portion 22 have a height difference in the z-axis direction, the first insulating plate 20 absorbs penetration damage of the cap plate 40 to significantly reduce the likelihood of the electrode assembly 10 from being torn by the cap plate 40 in the case of being crushed in the z-axis direction.

As an example, the plate-corresponding portion 22 includes the receiving grooves G1 and G2 to correspond to the uncoated regions 112 and 122.

Since the electrode assembly 10 is provided as two electrode assemblies in the present exemplary embodiment, the receiving grooves G1 and G2 are formed to correspond to the wide side walls 33 and 34 of the case 30.

When the electrode assembly 10 is provided as a single electrode assembly, one receiving groove may be provided to correspond to one wide side wall of the case.

Since the electrode assembly 10 is formed as two electrode assemblies, the uncoated regions (112, 112; 122, 122) drawn out of each electrode assembly 10 are bent after passing through the receiving grooves (G1, G2; G1, G2), and face each other above the plate-corresponding portion 22 to be respectively welded to one of the lead tabs 515 and 525.

The lead tabs 515 and 525 are coupled to the uncoated regions (112, 112; 122, 122) in the plate-corresponding portion 22, and are extended along the terminal-corresponding portions 21 to be electrically coupled to the negative and positive electrode terminals 51 and 52.

The negative and positive electrode terminals 51 and 52 are installed to penetrate the internal terminal holes 601 and 602 of the second insulating plate 60 and the terminal holes H1 and H2 of the cap plate 40, and are electrically coupled to the electrode assembly 10 through the uncoated regions 112 and 122.

The negative and positive electrode terminals 51 and 52 may be formed to have the same structure.

Referring to the drawings to describe the structure, the negative and positive electrode terminals 51 and 52 include internal plates 511 and 521, pillar portions 512 and 522, and external plates 513 and 523 that are integrally formed.

The internal plates 511 and 521 are formed to have a larger area than the pillar portions 512 and 522 and thus are welded to the lead tabs 515 and 525 in the terminal corresponding portions 21 with the larger areas, and are located between the first and second insulating plates 20 and 60.

The pillar portions 512 and 522 are coupled to the internal plates 511 and 521, and along with the gaskets 621 and 622, protrude out of the cap plate 40 through the internal terminal holes 601 and 602 and the terminal holes H1 and H2.

The external plates 513 and 523 are electrically coupled to the pillar portions 512 and 522 at an outer surface of the cap plate 40.

The pillar portions 512 and 522 are caulked or welded to the external plates 513 and 523 to be coupled thereto.

As such, the electrode assembly 10 is drawn out of the case 30 through the uncoated regions 112 and 122 and the negative and positive electrode terminals 51 and 52.

In one embodiment, the terminal-corresponding portions 21 of the first insulating plate 20 are provided with first support protrusions 211 that protrude toward the cap plate 40 at the opposite ends of the first insulating plate 20 in the length direction thereof (x-axis direction).

The first support protrusions 211 may support opposite ends of the narrow sides 45 and 46 of the cap plate 40 and the second insulating plate 60 that is provided at the inner side of the cap plate 40, thereby effectively coping with the case of being crushed in the z-axis direction.

In addition, the plate-corresponding portion 22 of the first insulating plate 20 is provided with second support protrusions 221 that protrude toward the cap plate 40 at opposite ends of the first insulating plate 20 in a width direction thereof (y-axis direction).

The second support protrusions 221 support opposite ends of the wide sides 43 and 44 of the cap plate 40 and the second insulating plate 60 that is provided at the inner side of cap plate 40, thereby effectively coping with the case of being crushed in the z-axis direction.

In one embodiment, the gaskets 621 and 622 are located between the negative and positive electrode terminals 51 and 52 and the cap plate 40 and between the negative and positive electrode terminals 51 and 52 and the second insulating plate 60 to electrically insulate and seal the negative and positive electrode terminals 51 and 52 and the cap plate 40 and to seal between the negative and positive electrode terminals 51 and 52 and the second insulating plate 60.

The gaskets 621 and 622 are installed between the pillar portions 512 and 522 of the negative and positive electrode terminals 51 and 52 and inner sides of the terminal holes H1 and H2 of the cap plate 40 to seal and electrically insulate between the pillar portions 512 and 522 and the terminal holes H1 and H2 of the cap plate 40.

The gaskets 621 and 622 are installed between the pillar portions 512 and 522 of the negative and positive electrode terminals 51 and 52 and inner sides of the internal terminal holes 601 and 602 of the second insulating plate 60 to seal between the pillar portions 512 and 522 and the internal terminal holes 601 and 602 of the second insulating plate 60.

In addition, the gaskets 621 and 622 include support flanges 641 and 642 that protrude outward of the negative and positive electrode terminals 51 and 52, and protruding portions 661 and 662 that protrude toward the terminal-corresponding portions 21 from the support flanges 641 and 642 and include coupling holes 651 and 652.

The support flanges 641 and 642 widely support peripheries of the internal terminal holes 601 and 602 of the second insulating plate 60.

By inserting the pillar portions 512 and 522 into the internal terminal holes 601 and 602 and the terminal holes H1 and H2 while locating the gaskets 621 and 622 therebetween and then inserting them into coupling holes 514 and 524 of the external plates 513 and 523 while locating external insulating members 631 and 632 therebetween, the pillar portions 512 and 522 are fixed to the external plates 513 and 523 by caulking or welding the vicinity of the coupling holes 514 and 524.

As such, the negative and positive electrode terminals 51 and 52 may be installed in the cap plate 40.

In a structure where the negative and positive electrode terminals 51 and 52 are installed in the second insulating plate 60 and the cap plate 40, the gaskets 621 and 622 prevent the electrolyte solution from leaking through the internal terminal holes 601 and 602 and the terminal holes H1 and H2.

In addition, the gaskets 621 and 622 may be further extended between the external insulating members 631 and 632 and the pillar portions 512 and 522 to seal therebetween.

In one embodiment, the first insulating plate 20 includes hooks 23 and 24 that protrude toward the cap plate 40 in the terminal-corresponding portions 21 and that subsequently protrude toward the negative and positive electrode terminals 51 and 52.

The hooks 23 and 24 are fastened to the coupling holes 651 and 652 that are formed in the protruding portions 661 and 662 of the gaskets 621 and 622.

As the hooks 23 and 24 are fastened to the coupling holes 651 and 652 of the gaskets 621 and 622, the first insulating plate 20 is fixed between the cap plate 40 and the electrode assembly 10.

In this case, the first and second support protrusions 211 and 221 support the cap plate 40 and the second insulating plate 60.

Further, the second insulating plate 60 electrically insulates the lead tabs 515 and 525 coupled to the uncoated regions 112 and 122 from the cap plate 40.

In addition, the second insulating plate 60 blocks penetration of the cap plate 40 in the case of being crushed in the z-axis direction, thereby further preventing the electrode assembly 20 from being torn.

While this invention has been described in connection with what is presently considered to be practical exemplary embodiments, it is to be understood that the invention is not limited to the disclosed embodiments, but, on the contrary,

| Description of Symbols | |
|---|---|
| 10: electrode assembly | 11: first electrode (negative electrode) |
| 12: second electrode (positive electrode) | 13: separator |
| 20: first insulating plate | 21: terminal-corresponding portion |
| 22: plate-corresponding portion | 23, 24: hook |
| 30: case | 31: opening |
| 33, 34: wide side wall | 35, 36: narrow side wall |
| 40: cap plate | 41: vent hole |
| 42: electrolyte injection opening | 43, 44: wide side |
| 45, 46: narrow side | 51: first electrode terminal (negative terminal) |
| 52: second electrode terminal (positive electrode terminal) | |
| 60: second insulating plate | |
| 111, 121: coated region | 112, 122: uncoated region |
| 204, 604: first and second internal vent holes | |
| 205, 605: first and second internal electrolyte injection openings | |
| 211: first support protrusion | 221: second support protrusion |
| 411: vent plate | 412: notch  421: sealing cap |
| 511, 521: internal plate | 512, 522: pillar portion |
| 513, 523: external plate | 514, 524: coupling hole |
| 515, 525: lead tab | 601, 602: internal terminal hole |
| 621, 622: gasket | 631, 632: external insulating member |
| 641, 642: support flange | 651, 652: coupling hole |
| 661, 662: protruding portion | D: distance |
| G1, G2: receiving groove | H1, H2: terminal hole |
| T: one winding range | |

What is claimed is:

1. A rechargeable battery comprising:
an electrode assembly comprising electrodes having coated and uncoated regions and being located at opposite sides of a separator;
a case accommodating the electrode assembly;
a cap plate sealing the case and having terminal holes through which electrode terminals coupled to the uncoated regions extend;
a gasket between each electrode terminal and the cap plate; and
a first insulating plate between the cap plate and the electrode assembly and fastened to the gaskets, wherein the uncoated regions and the electrode terminals are coupled by lead tabs located on the first insulating plate facing the cap plate, and wherein the uncoated regions pass through receiving grooves on the first insulating plate and are coupled to the lead tabs.

2. A rechargeable battery comprising:
an electrode assembly comprising electrodes having coated and uncoated regions and being located at opposite sides of a separator;
a case accommodating the electrode assembly;
a cap plate sealing the case and having terminal holes through which electrode terminals coupled to the uncoated regions extend;
a gasket between each electrode terminal and the cap plate; and
a first insulating plate between the cap plate and the electrode assembly and fastened to the gaskets, wherein the first insulating plate includes terminal-corresponding portions at opposite lateral sides that are located closer to the electrode assembly than the cap plate to face the electrode terminals, and a plate-corresponding portion located between the terminal-corresponding portions closer to the cap plate than the electrode assembly, wherein there is a height difference between the terminal-corresponding portions and the plate-corresponding portion, and
wherein the plate-corresponding portion includes receiving grooves that generally correspond to the uncoated regions.

3. The rechargeable battery of claim 1, wherein the electrode assembly comprises one assembly or two assemblies, and wherein the receiving grooves are formed at one side or opposite sides of the plate-corresponding portion to correspond to side walls of the case.

4. The rechargeable battery of claim 1, wherein the electrode assembly comprises two electrode assemblies, and wherein the uncoated regions have the same polarity, face each other, and are each welded to one of the lead tabs.

5. The rechargeable battery of claim 2, wherein the terminal-corresponding portions further include first support protrusions that protrude toward the cap plate from the first insulating plate in a length direction thereof to support opposite ends of the cap plate.

6. The rechargeable battery of claim 2, wherein the plate-corresponding portion further includes second support protrusions that protrude toward the cap plate from the first insulating plate in a width direction thereof to support opposite ends of the cap plate.

7. The rechargeable battery of claim 2, wherein lead tabs for connecting the uncoated region and the electrode terminals are coupled to the uncoated regions that pass through the receiving grooves and are bent above the plate-corresponding portion, and are extended to the terminal-corresponding portions and coupled to the electrode terminals.

8. The rechargeable battery of claim 6, further comprising a second insulating plate that is provided with internal terminal holes generally corresponding to the terminal holes, is located at an inner side of the cap plate, and is penetrated by the gaskets and the electrode terminals to support the gaskets so as to insulate lead tabs coupling the electrode assembly and the electrode terminals from the cap plate.

9. The rechargeable battery of claim 8, wherein the first and second insulating plates respectively include first and second internal vent holes that generally correspond to a vent hole provided in the cap plate.

10. The rechargeable battery of claim 8, wherein the first and second insulating plates respectively include first and second internal electrolyte injection openings corresponding to an electrolyte injection opening on the cap plate.

11. The rechargeable battery of claim 2, wherein the first insulating plate includes hooks that protrude toward the cap plate from the terminal-corresponding portions, protrude toward the electrode terminals, and are fastened to the gaskets.

12. The rechargeable battery of claim 11, wherein the gaskets include support flanges that are located between the terminal holes of the cap plate and the electrode terminals to protrude from the electrode terminal, and protruding portions that protrude toward the terminal-corresponding portions from the support flanges and are fastened to the hooks through coupling holes.

13. The rechargeable battery of claim 2, wherein each of the electrode terminals comprises:
an internal plate coupled in the terminal-corresponding portion to a respective lead tabs and are coupled to the uncoated regions and the electrode terminals;
pillar portions that protrude from the cap plate through the gaskets and the terminal holes in the internal plate; and
external plates that are coupled to the pillar portions at an outer surface of the cap plate.

* * * * *